(12) United States Patent
Smaus et al.

(10) Patent No.: US 11,175,916 B2
(45) Date of Patent: Nov. 16, 2021

(54) SYSTEM AND METHOD FOR A LIGHTWEIGHT FENCING OPERATION

(71) Applicant: Advanced Micro Devices, Inc., Santa Clara, CA (US)

(72) Inventors: Gregory W. Smaus, Austin, TX (US); John M. King, Austin, TX (US)

(73) Assignee: Advanced Micro Devices, Inc., Santa Clara, CA (US)

(*) Notice: Subject to any disclaimer, the term of this patent is extended or adjusted under 35 U.S.C. 154(b) by 172 days.

(21) Appl. No.: 15/846,457

(22) Filed: Dec. 19, 2017

(65) Prior Publication Data

US 2019/0187990 A1 Jun. 20, 2019

(51) Int. Cl.
*G06F 9/30* (2018.01)
(52) U.S. Cl.
CPC ...... *G06F 9/30043* (2013.01); *G06F 9/30145* (2013.01)
(58) Field of Classification Search
None
See application file for complete search history.

(56) References Cited

U.S. PATENT DOCUMENTS 8,171,261 B2 * 5/2012 Palanca ............... G06F 9/30047
712/214

OTHER PUBLICATIONS

Trachsel et al.; On the Effectiveness of Speculative and Selective Memory Fences; 2006; IEEE.*

* cited by examiner

*Primary Examiner* — Corey S Faherty
(74) *Attorney, Agent, or Firm* — Volpe Koenig

(57) ABSTRACT

A system and method for a lightweight fence is described. In particular, micro-operations including a fencing micro-operation are dispatched to a load queue. The fencing micro-operation allows micro-operations younger than the fencing micro-operation to execute, where the micro-operations are related to a type of fencing micro-operation. The fencing micro-operation is executed if the fencing micro-operation is the oldest memory access micro-operation, where the oldest memory access micro-operation is related to the type of fencing micro-operation. The fencing micro-operation determines whether micro-operations younger than the fencing micro-operation have load ordering violations and if load ordering violations are detected, the fencing micro-operation signals the retire queue that instructions younger than the fencing micro-operation should be flushed. The instructions to be flushed should include all micro-operations with load ordering violations.

20 Claims, 5 Drawing Sheets

SYSTEM AND METHOD FOR A LIGHTWEIGHT FENCING OPERATION

BACKGROUND

A processor generally has associated with it an instruction pipeline which includes fetching, decoding (or dispatching) and executing stages. An instruction set architecture's memory ordering rules specify when the processor and associated logic must make memory micro-operations appear to be executed in program order to software (stronger memory ordering) or when memory micro-operations can appear to execute out of program order to software (weaker memory ordering). In this instance, software can include a user program, operating system or the like.

A memory fencing micro-operation gives software the ability to strengthen memory ordering where it is needed by preventing memory micro-operations younger than the memory fencing micro-operation from appearing to execute before memory micro-operations older than the memory fencing micro-operation. There are different types of memory fencing micro-operations: 1) load fencing micro-operations fence older load micro-operations from younger load micro-operations; 2) store fencing micro-operations fence older store micro-operations from younger store micro-operations; and 3) memory fencing micro-operations fence older load micro-operations and store micro-operations from younger load micro-operations and store micro-operations.

A load fencing micro-operation can be implemented in hardware by stalling execution of all instructions younger than the load fencing micro-operation. This results in poor system performance. A load fencing micro-operation can also be implemented by having all load micro-operations perform an age compare against memory micro-operations, looking for older load fencing micro-operations. If the load micro-operation finds an older, uncompleted load fencing micro-operation, the load micro-operation would then go to sleep until the load fencing micro-operation completes. The load micro-operation can execute and/or complete upon completion of the load fencing micro-operation. While the performance of the latter implementation is better than the former implementation (allowing micro-operations younger than the load fencing micro-operation to get a chance to execute and/or complete), the latter implementation has a higher hardware cost. While the latter implementation does allow execution and/or completion of some micro-operations younger than the load fencing micro-operation, it still does not allow execution and/or completion of younger load micro-operations.

BRIEF DESCRIPTION OF THE DRAWINGS

A more detailed understanding may be had from the following description, given by way of example in conjunction with the accompanying drawings wherein.

DETAILED DESCRIPTION

Figure 1:
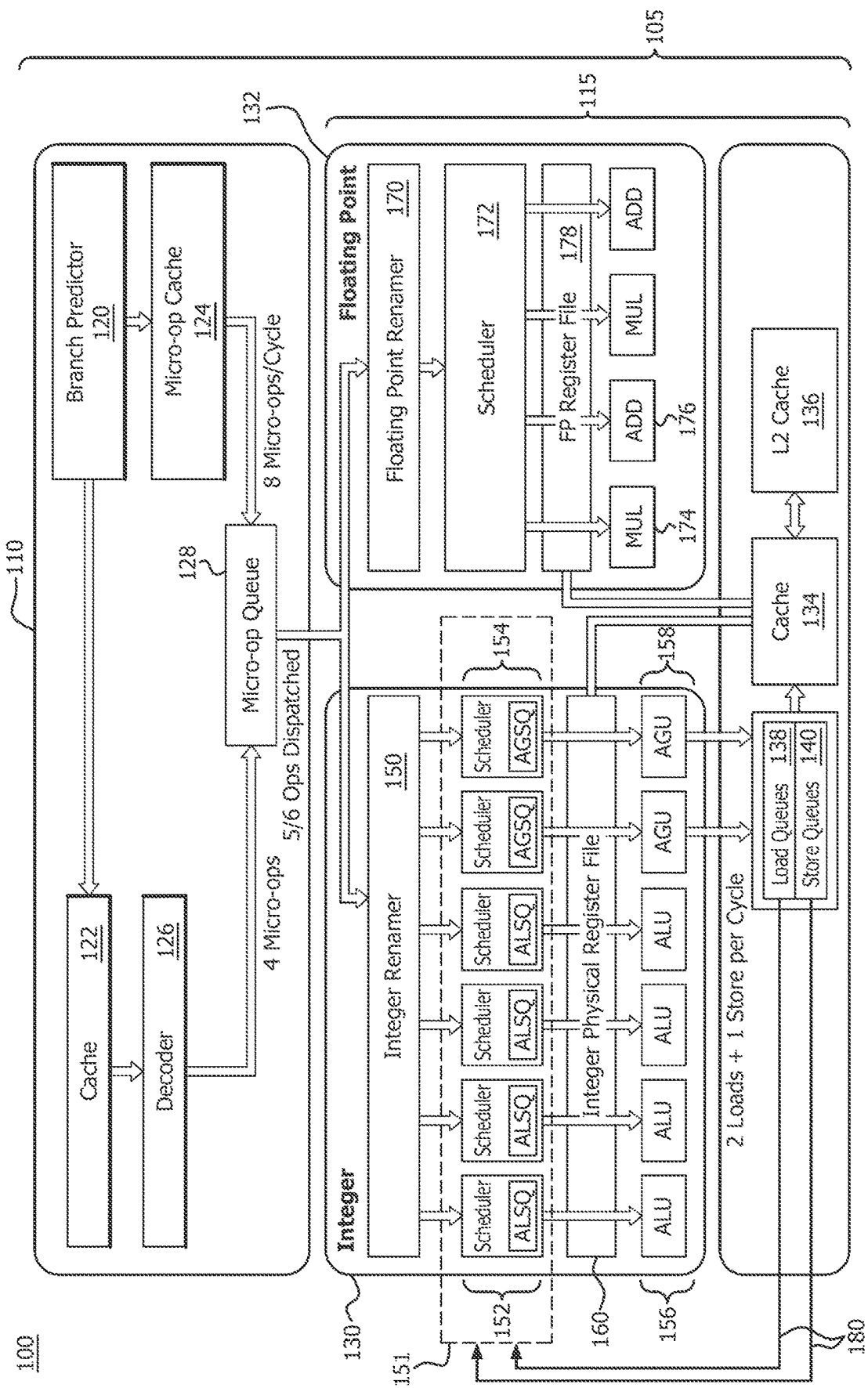
FIG. 1 is a high level block and flow diagram of a core processing unit of a processor in accordance with certain implementations.

Processors generally operate pursuant to an instruction pipeline which includes fetching, decoding (or dispatching) and executing stages. The decoding or dispatching stage retrieves an instruction from a fetch queue and allocates entries in load queues (LDQ) or store queues (STQ). The entries in the LDQ and STQ execute per an instruction set architecture's memory ordering rules. Memory fencing micro-operations give software the ability to strengthen memory ordering where it is needed by preventing memory micro-operations younger than the memory fencing micro-operation from appearing to execute before memory micro-operations older than the memory fencing micro-operation.

A system and method for a lightweight fencing micro-operation is described. In particular, micro-operations including at least a lightweight fencing micro-operation are dispatched to a load queue. The lightweight fencing micro-operation allows applicable micro-operations younger than the lightweight fencing micro-operation to execute. The lightweight fencing micro-operation is executed if the lightweight fencing micro-operation is the oldest applicable memory access micro-operation. The lightweight fencing micro-operation determines whether younger micro-operations have load ordering violations and if load ordering violations are detected, the lightweight fencing micro-operation signals the retire logic that instructions younger than the lightweight fencing micro-operation should be flushed. The instructions to be flushed should include all micro-operations with load ordering violations and execution should be re-started at the oldest flushed instruction. In an implementation, if the lightweight fencing micro-operation is a load fencing micro-operation, then the load fencing micro-operation is executed if the load fencing micro-operation is the oldest load micro-operation in the load queue. That is, all older load micro-operations have executed or completed. Micro-operations younger than the load fencing micro-operation are allowed to execute. In an implementation, if the lightweight fencing micro-operation is a memory fencing micro-operation, then the memory fencing micro-operation is executed if the memory fencing micro-operation is the oldest memory access micro-operation. That is, all older load micro-operations and store micro-operations have executed or completed. Non-store micro-operations younger than the memory fencing micro-operation are allowed to execute. Although the illustrative implementation described herein has the lightweight fencing micro-operation dispatched to a load queue, other queues can be used without departing from the scope of the specification and claims herein.

This application describes several different types of fencing operations. The micro-operations that are related to a particular type of fencing operation are referred to as "applicable micro-operations" of that fencing operation. In a first category of fencing micro-operations, the applicable micro-operations are those micro-operations older than the fence micro-operation that are required to be completed before the fence micro-operation can execute. In a first example, when the fencing micro-operation is a load fence, the applicable micro-operations are all load micro-operations older than the fence micro-operation. In a second example, when the fencing micro-operation is a memory fence, the applicable micro-operations are all load and store micro-operations older than the fence micro-operation.

In a second category of fencing micro-operations, the applicable micro-operations are those micro-operations younger than the fencing micro-operation, which are allowed to execute. In a third example, when the fencing micro-operation is a load fence, the applicable micro-operations are all micro-operations. In a fourth example, when the fencing operation is a memory fencing operation, the applicable micro-operations are non-store micro-operations.

FIG. 1 is a high level block and flow diagram of a core processing unit 105 of a processor 100 in accordance with certain implementations. The core processing unit 105 includes a decoder unit 110 which provides micro operations (micro-ops) to a scheduler and execution unit (SCEX) 115. The decoder unit 110 includes a branch predictor 120 connected to a cache 122 and a micro-op cache 124. The cache 122 is further connected to a decoder 126. The decoder 126 and the micro-op cache 124 are connected to a micro-op queue 128.

The SCEX 115 includes an integer SCEX 130 and a floating point SCEX 132, both of which are connected to a cache 134. The cache 134 is further connected to a L2 cache 136, LDQ 138 and STQ 140. The integer SCEX 130 includes an integer renamer 150 which is connected to a scheduler 151, which includes arithmetic logic unit (ALU) scheduler queues (ALSQs) 152 and address generation unit (AGU) scheduler queues (AGSQs) 154. The scheduler 151, and in particular the ALSQs 152 and AGSQs 154, are further connected to ALUs 156 and AGUs 158, respectively. The LDQ 138 and STQ 140 are connected to the scheduler 151 via path 180 to send deallocation signals. The integer SCEX 130 also includes an integer physical file register 160. The floating point SCEX 132 includes a floating point renamer 170, which is connected to a scheduler 172. The scheduler 172 is further connected to multipliers 174 and adders 176. The floating point SCEX 132 also includes a floating point physical file register 178.

A pipelined processor requires a steady stream of instructions to be fed into the pipeline. The branch predictor 120 predicts which set of micro-operations are fetched and executed in the pipelined processor. These micro-operations are fetched and stored in cache 122, which in turn are decoded by the decoder 126. The micro-op cache 124 caches the micro-operations from the branch predictor 120 as the decoder 126 decodes the micro-operations from the cache 122. The micro-op queue 128 stores and queues up the micro-operations from the decoder 126 and micro-op cache 124 for purposes of dispatching the micro-operations for execution. The micro-operations can include a variety of micro-operations including load micro-operations, store micro-operations, multiplier micro-operations and the like.

In accordance with an implementation, a lightweight fencing micro-operation is structured or prepared as a load micro-operation which may not have a memory access component but which still flows through the pipeline as other load micro-operations. In an implementation, the lightweight fencing micro-operation has bit(s) set to indicate that this load micro-operation is a lightweight fencing micro-operation.

In particular, the micro-op queue 128 dispatches the lightweight fencing micro-operation along with other micro-operations to the LDQ 138 or the STQ 140 to store the payloads associated with the micro-operations. The lightweight fencing micro-operation waits in the LDQ 138 and allows applicable micro-operations younger than the lightweight fencing micro-operation to generally execute or complete in most situations while not requiring extra hardware as described herein above for other techniques.

After all applicable memory access micro-operations older than the lightweight fencing micro-operation have completed, the lightweight fencing micro-operation checks for potential load ordering violations. If any potential load ordering violations are detected, the lightweight fencing micro-operation signals the retire logic that instructions younger than the lightweight fencing micro-operation should be flushed. The instructions to be flushed should include all micro-operations with load ordering violations, and execution should be re-started at the oldest flushed instruction.

Load ordering violations are visible to software (e.g., user program, operating system and the like) when hardware (e.g., processor) allows a younger load micro-operation to complete with an older version of data (stale data) before an older applicable memory access micro-operation completes. In the case where the older applicable memory access micro-operation is a load micro-operation, the older load micro-operation completes with a newer version of its data. Since it is difficult to precisely identify this case, the actual implementation of detecting a load ordering violation maybe less precise.

In an illustrative example, potential load ordering violations to coherent memory are detected when an incoming invalidating probe is to the same memory location as a non-oldest, completed load micro-operation, i.e. the invalidating probe is assumed to be on behalf of another thread storing to the same memory location as the non-oldest, completed load micro-operation, making the non-oldest, completed load micro-operation's data stale. Other mechanisms for detecting potential load ordering violations can be used without departing from the scope of the specification and claims herein.

Load ordering violations to non-coherent memory have the same architectural requirement as load ordering violations to coherent memory, but invalidating probes are not launched on behalf of non-coherent store micro-operations, so it is not possible to detect another thread modifying the non-coherent, non-oldest, completed load micro-operation's data. In an illustrative example, potential load ordering violations to non-coherent memory are detected when younger, non-coherent load micro-operations have either already made their memory request to the system, or are in the process of completing or have already completed. Other mechanisms for detecting potential load ordering violations can be used without departing from the scope of the specification and claims herein.

The lightweight fencing micro-operation can be used as a load fencing micro-operation as well as a memory fencing micro-operation. In the case where the lightweight fencing micro-operation is used as a load fencing micro-operation, the load fencing micro-operation enforces ordering of load micro-operations, i.e., all load micro-operations older than the load fencing micro-operation must be complete before load micro-operations younger than the load fencing micro-operation can appear to have completed. In the case where the lightweight fencing micro-operation is used as a memory fencing micro-operation, all load micro-operations and store micro-operations older than the memory fencing micro-operation must be complete before load micro-operations and store micro-operations younger than the memory fencing micro-operation can appear to have completed.

Figure 2:
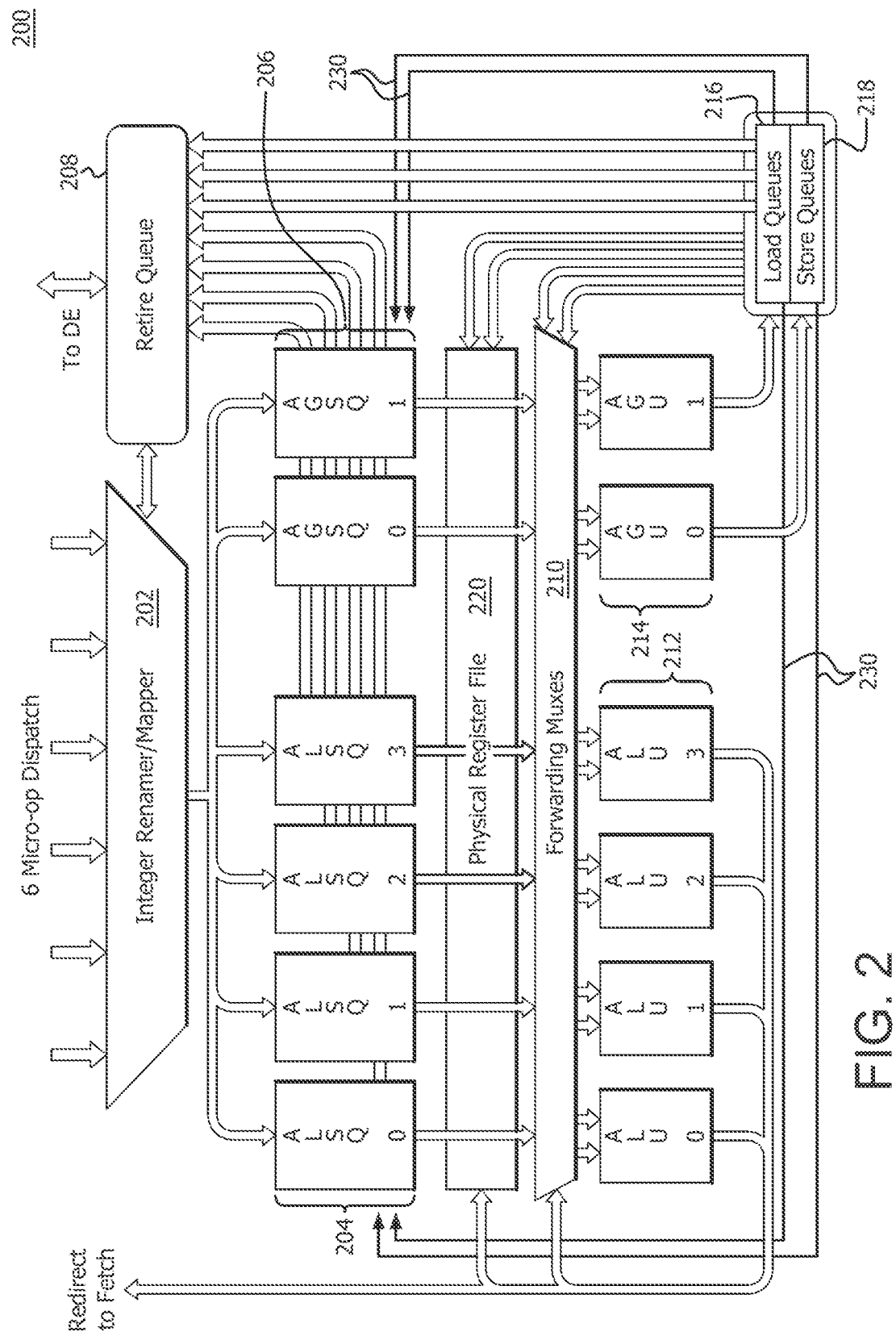
FIG. 2 is a high level block and flow diagram of an integer scheduler and/or execution unit in accordance with certain implementations.

FIG. 2 is a high level block diagram of an integer scheduler/execution unit 200 in accordance with certain implementations. The integer scheduler/execution unit 200 includes an integer renamer/mapper 202 which is connected to ALSQs 204, AGSQs 206 and a retire queue 208. The ALSQs 204 and AGSQs 206 are further connected to forwarding multiplexors 210, which in turn are connected to ALUs 212 and AGUs 214, respectively. The AGUs 214 are connected to LDQs 216 and STQs 218. The integer scheduler/execution unit 200 also includes a physical file register 220. The LDQs 216 and STQs 218 are connected to $AGSQ_0$-$AGSQ_1$ 206 via path 230 to send deallocation signals and to retire queue 208.

Similar to FIG. 1, micro-operations including a lightweight fencing micro-operation are dispatched to the LDQs 216 and STQs 218. The lightweight fencing micro-operation waits in the LDQs 216 and allows applicable micro-operations younger than the lightweight fencing micro-operation to generally execute or complete. After all applicable memory access micro-operations older than the lightweight fencing micro-operation have completed, the lightweight fencing micro-operation checks for potential load ordering violations. If any potential load ordering violations were detected, the lightweight fencing micro-operation signals the retire queue 208 that instructions younger than the lightweight fencing micro-operation should be flushed. The instructions to be flushed should include all micro-operations with load ordering violations and execution should be re-started at the oldest flushed instruction.

Figure 3:
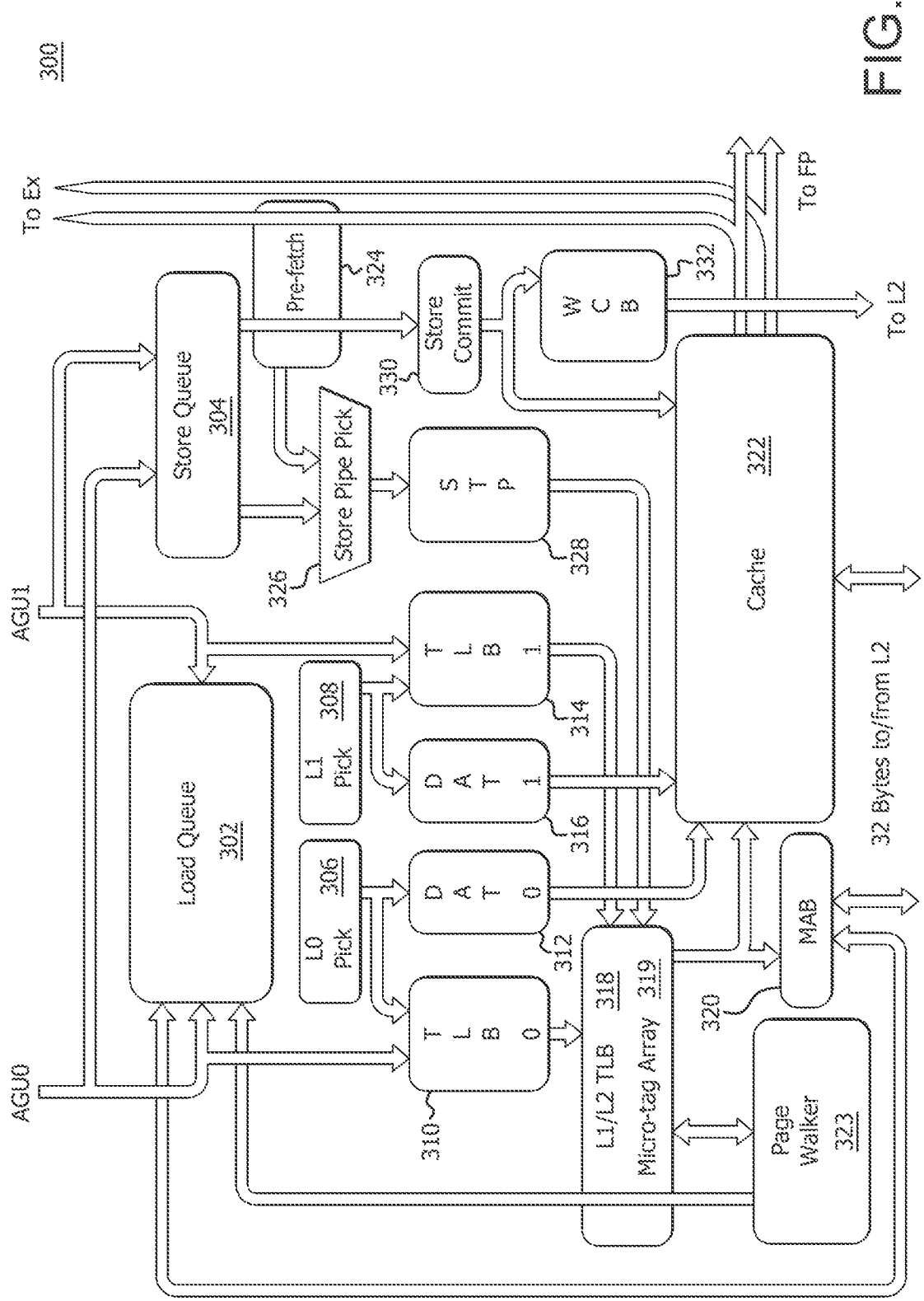
FIG. 3 is a high level block and flow diagram of a scheduler and/or execution unit in accordance with certain implementations.

FIG. 3 is a high level block and flow diagram of a load-store/data cache (LSDC) unit 300 in accordance with certain implementations. The LSDC unit 300 includes a LDQ 302, a STQ 304, a load 0 (L0) picker 306 and a load 1 (L1) picker 308. The L0 picker 306 is connected to a translation lookaside buffer (TLB) and micro-tag access pipeline 0 (TLB0) 310 and a data cache access pipeline (data pipe 0) 312. The L1 picker 308 is connected to a translation lookaside buffer (TLB) and micro-tag access pipeline 1 (TLB1) 314 and a data cache access pipeline (data pipe 1) 316. The TLB0 310 and TLB1 314 are further connected to L1/L2 TLB 318, a page walker 323, and micro-tag array 319, which in turn is connected to a miss address buffer (MAB) 320, assists in reading data from a cache 322. The MAB 320 tracks requests that are made to the cache 322 and in particular, the type of memory misses. The MAB 320 can include multiple MABs. The data pipe 0 312 and data pipe 1 316 are connected to the cache 322. The STQ 304 is connected to a pre-fetcher 324 and a store pipe picker 326, which in turn is connected to a store pipeline (STP) 328. The STP 328 is also connected to the L1/L2 TLB 318 and the micro-tag array 319. The STQ 304 is further connected to a store commit pipeline 330, which in turn is connected to a write combining buffer (WCB) 332 and the cache 322. The MAB 320 is connected to LDQ 302.

Similar to FIGS. 1 and 2, micro-operations including a lightweight fencing micro-operation are dispatched to the LDQ 302 and STQ 304. The lightweight fencing micro-operation waits in the LDQ 302 and allows applicable micro-operations younger than the lightweight fencing micro-operation to generally execute or complete. After all applicable memory access micro-operations older than the lightweight fencing micro-operation have completed, the lightweight fencing micro-operation checks for potential load ordering violations.

In an implementation, potential load ordering violations to non-coherent memory can be determined by the LDQ 302 and the MAB 320. MAB 320 detects potential load ordering violations to non-coherent memory when non-coherent load micro-operations younger than the lightweight fencing micro-operation have already made their memory request to the system. The LDQ 302 detects potential load ordering violations to non-coherent memory when non-coherent load micro-operations younger than the lightweight fencing micro-operation are in the process of completing or have already completed. If any potential load ordering violations were detected, the LDQ 302 (for the lightweight fencing micro-operation) signals the retire queue 208 that instructions younger than the lightweight fencing micro-operation should be flushed. The instructions to be flushed should include all micro-operations with load ordering violations and execution should be re-started at the oldest flushed instruction.

Figure 4:
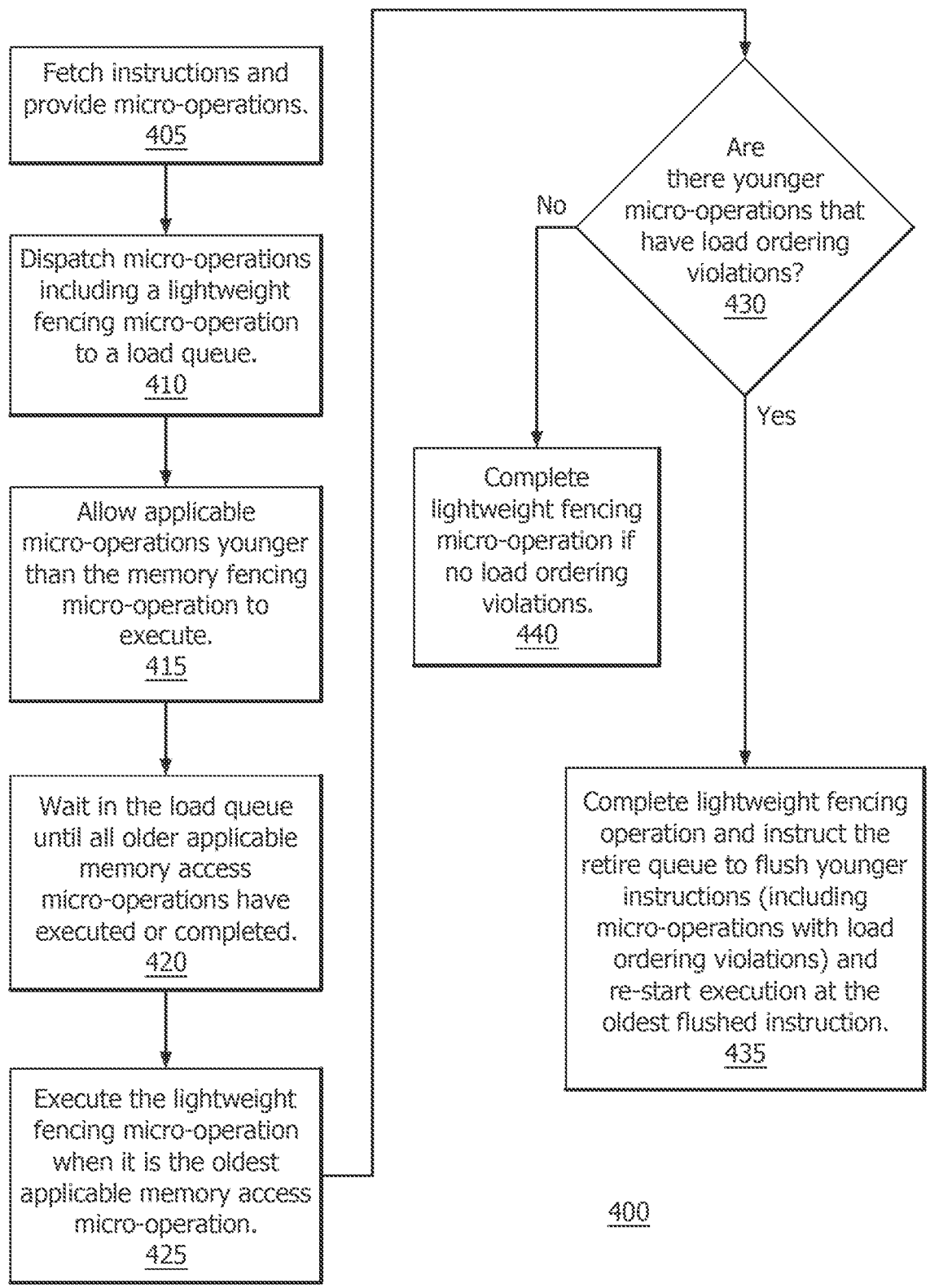
FIG. 4 is a flow diagram for a lightweight fence in accordance with certain implementations.

FIG. 4 is a flow diagram 400 of a method for a lightweight fencing operation in accordance with certain implementations. Micro-operations are fetched, decoded and provided to a micro-op queue (step 405). The micro-op queue dispatches the micro-operations including a lightweight fencing micro-operation to a load queue (step 410). The load queue and lightweight fencing micro-operation allow applicable micro-operations younger than the memory fencing micro-operation to execute (step 415). The lightweight fencing micro-operation waits in the load queue until all older applicable memory access micro-operations have executed or completed (step 420). The lightweight fencing micro-operation is executed when the lightweight fencing micro-operation is the oldest applicable memory access micro-operation (step 425). A determination is made as to whether there are younger micro-operations than the lightweight fencing micro-operation that have load ordering violations (step 430). If yes, complete the lightweight fencing micro-operation and instruct the retire queue to flush instructions younger than the lightweight fencing micro-operation, (the instructions to be flushed should include all micro-operations with load ordering violations) and re-start execution at the oldest flushed instruction (step 435). If there are no load ordering violations, the lightweight fencing micro-operation completes (step 440).

Figure 5:
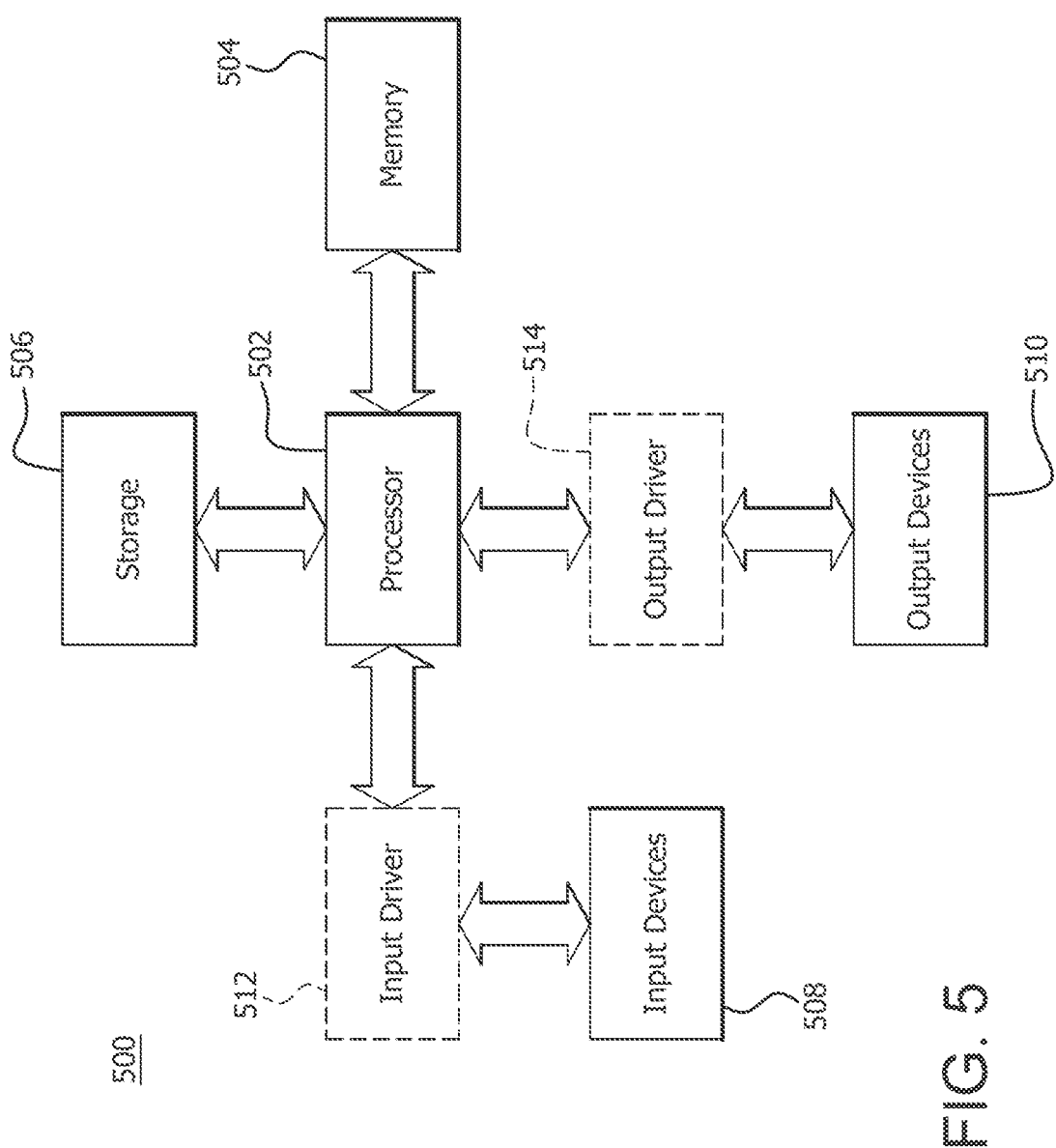
FIG. 5 is a block diagram of an example device in which one or more disclosed implementations may be implemented.

FIG. 5 is a block diagram of an example device 500 in which one or more portions of one or more disclosed examples are implemented. The device 500 includes, for example, a head mounted device, a server, a computer, a gaming device, a handheld device, a set-top box, a television, a mobile phone, or a tablet computer. The device 500 includes a compute node or processor 502, a memory 504, a storage 506, one or more input devices 508, and one or more output devices 510. The device 500 also optionally includes an input driver 512 and an output driver 514. It is understood that the device 500 includes additional components not shown in FIG. 5.

The compute node or processor 502 includes a central processing unit (CPU), a graphics processing unit (GPU), a CPU and GPU located on the same die, or one or more processor cores, wherein each processor core may be a CPU or a GPU. The memory 504 is located on the same die as the compute node or processor 502, or is located separately from the compute node or processor 502. In an implementation, the memory 504 includes a volatile or non-volatile memory, for example, random access memory (RAM), dynamic RAM, or a cache.

The storage 506 includes a fixed or removable storage, for example, a hard disk drive, a solid state drive, an optical disk, or a flash drive. The input devices 508 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 510 include a display, a speaker, a printer, a haptic feedback device, one or more lights, an antenna, or a network connection (e.g., a wireless local area network card for transmission and/or reception of wireless IEEE 802 signals).

The input driver 512 communicates with the compute node or processor 502 and the input devices 508, and permits the compute node or processor 502 to receive input from the input devices 508. The output driver 514 communicates with the compute node or processor 502 and the output devices 510, and permits the processor 502 to send output to the output devices 510. It is noted that the input driver 512 and the output driver 514 are optional components, and that the device 500 will operate in the same manner if the input driver 512 and the output driver 514 are not present.

In general, a method for processing micro-operations includes dispatching micro-operations including a fencing micro-operation to a load queue and allowing one or more micro-operations younger than the fencing micro-operation to execute, where the one or more micro-operations are related to a type of fencing micro-operation. The fencing micro-operation executes if the fencing micro-operation is the oldest memory access micro-operation and instructs a retire queue to flush instructions younger than the fencing micro-operation if a load ordering violation is detected, where the oldest memory access micro-operation is related to a type of fencing micro-operation. In an implementation, the fencing micro-operation waits in the load queue until all older memory access micro-operations have executed or completed, where the older memory access micro-operation is related to a type of fencing micro-operation. In an implementation, the method further includes re-starting execution at an oldest flushed instruction when a load ordering violation has been detected. In an implementation, the method further includes detecting whether the younger micro-operations have load ordering violations and completing the fencing micro-operation if no load ordering violations are detected. In an implementation, the instructions include micro-operations having load ordering violations. In an implementation, when the type of fencing micro-operation is a load fencing micro-operation, the load fencing micro-operation is executed if the load fencing micro-operation is oldest load micro-operation in the load queue and micro-operations younger than the load fencing micro-operation are allowed to execute or complete. In an implementation, when the type of fencing micro-operation is a load fencing micro-operation, the load fencing micro-operation is executed if older load micro-operations in the load queue have executed or completed and micro-operations younger than the load fencing micro-operation are allowed to execute or complete. In an implementation, when the type of fencing micro-operation is a memory fencing micro-operation, the memory fencing micro-operation is executed if the memory fencing micro-operation is oldest applicable memory access micro-operation and non-store micro-operations younger than the memory fencing micro-operation are allowed to execute or complete. In an implementation, when the type of fencing micro-operation is a memory fencing micro-operation, the memory fencing micro-operation is executed if older load micro-operations and older store micro-operations have executed or completed and non-store micro-operations younger than the memory fencing micro-operation are allowed to execute or complete. In an implementation, control bits are set in a load micro-operation to indicate that the load micro-operation is the fencing micro-operation.

In general, a processor for processing micro-operations includes a micro-op queue, a load queue and a retire queue. The micro-op queue is configured to dispatch micro-operations including a fencing micro-operation to the load queue The load queue is configured to allow one or more micro-operations younger than the fencing micro-operation to execute, where the one or more micro-operations are related to a type of fencing micro-operation. The load queue is further configured to execute the fencing micro-operation if the fencing operation is an oldest memory access micro-operation, where the oldest memory access micro-operation is related to a type of fencing micro-operation. The load queue is further configured to instruct the retire queue to flush younger instructions than the fencing micro-operation if a load ordering violation is detected. In an implementation, the fencing micro-operation waits in the load queue until all older memory access micro-operations have executed or completed, where the older micro-operations are related to a type of fencing micro-operation. In an implementation, the retire queue is configured to re-start execution at the oldest flushed instruction when a load ordering violation has been detected. In an implementation, the younger micro-operations are younger memory access micro-operations. In an implementation, when the type of fencing micro-operation is a load fencing micro-operation, the load fencing micro-operation is executed if the load fencing micro-operation is the oldest load micro-operation in the load queue and micro-operations younger than the load fencing micro-operation are allowed to execute or complete. In an implementation, when the type of fencing micro-operation is a load fencing micro-operation, the load fencing micro-operation is executed if older load micro-operations in the load queue have executed or completed and micro-operations younger than the load fencing micro-operation are allowed to execute or complete. In an implementation, when the type of fencing micro-operation is a memory fencing micro-operation, the memory fencing micro-operation is executed if the memory fencing micro-operation is the oldest memory access micro-operation and non-store micro-operations younger than the memory fencing micro-operation are allowed to execute or complete. In an implementation, when the type of fencing micro-operation is a memory fencing micro-operation, the memory fencing micro-operation is executed if older load micro-operations and older store micro-operations have executed or completed and non-store micro-operations younger than the memory fencing micro-operation are allowed to execute or complete. In an implementation, control bits are set in a load micro-operation to indicate that the load micro-operation is the fencing micro-operation. In an implementation, the instructions include micro-operations having load ordering violations.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for processing micro-operations, the method comprising:
    dispatching micro-operations including a fencing micro-operation to a load queue;
    executing one or more micro-operations younger than the fencing micro-operation, wherein the one or more micro-operations are each respectively fenced by one of a plurality of types of fencing micro-operation;
    executing the fencing micro-operation in response to the fencing micro-operation being an oldest memory access micro-operation, wherein the oldest memory access micro-operation is fenced by a particular type of the fencing micro-operation; and
    in response to detecting a load ordering violation:
        instructing a retire queue to flush instructions younger than the fencing micro-operation, and
        restarting execution at an oldest flushed instruction from the retire queue.

2. The method of claim 1, wherein the fencing micro-operation waits in the load queue until all older memory access micro-operations have executed or completed, wherein the older micro-operations are fenced by the particular type of the fencing micro-operation.

3. The method of claim 1, wherein in response to not detecting a load ordering violation for a second fencing micro-operation:
    completing the second fencing micro-operation.

4. The method of claim 1, wherein the retire queue includes micro-operations having load ordering violations.

5. The method of claim 1, wherein the particular type of the fencing micro-operation is a load fencing micro-operation, and executing the fencing micro-operation in response to the fencing operation being an oldest memory access micro-operation comprises executing the fencing micro-operation in response to the load fencing micro-operation being an oldest load micro-operation in the load queue and allowing micro-operations younger than the load fencing micro-operation to execute or complete.

6. The method of claim 1, wherein the particular type of the fencing micro-operation is a memory fencing micro-operation, and executing the fencing micro-operation in response to the fencing micro-operation being an oldest memory access micro-operation comprises executing the fencing operation in response to the memory fencing micro-operation being an oldest applicable memory access micro-operation and allowing non-store micro-operations younger than the memory fencing micro-operation to execute or complete.

7. The method of claim 1, wherein the particular type of the fencing micro-operation is a memory fencing micro-operation, and executing the fencing micro-operation in response to the fencing micro-operation being an oldest memory access micro-operation comprises executing the fencing operation in response to older load micro-operations and older store micro-operations being executed or completed and allowing non-store micro-operations younger than the memory fencing micro-operation to execute or complete.

8. The method of claim 1, wherein the particular type of the fencing micro-operation is a memory fencing micro-operation, and executing the fencing micro-operation in response to the fencing micro-operation being an oldest memory access micro-operation comprises executing the fencing operation in response to older load micro-operations and older store micro-operations being executed or completed and allowing non-store micro-operations younger than the memory fencing micro-operation to execute or complete.

9. The method of claim 1, wherein control bits are set in a load micro-operation to indicate that the load micro-operation is the fencing micro-operation.

10. A processor for processing micro-operations, comprising:
    an execution unit configured to dispatch micro-operations from a micro-op queue including a fencing micro-operation to a load queue, wherein the execution unit configured to:
    execute one or more micro-operations younger than the fencing micro-operation, wherein the one or more micro-operations are each respectively fenced by one of a plurality of types of fencing micro-operation;
    execute the fencing micro-operation in response to the fencing operation being an oldest memory access micro-operation, wherein the oldest memory access micro-operation is fenced by a particular type of the fencing micro-operation; and
    in response to detecting a load ordering violation:
        instruct a retire queue to flush younger instructions than the fencing micro-operation, and
        restart execution at an oldest flushed instruction from the retire queue.

11. The processor of claim 10, wherein the fencing micro-operation waits in the load queue until all older memory access micro-operations have executed or completed, wherein the older micro-operations are fenced by the particular type of the fencing micro-operation.

12. The processor of claim 10, wherein in response to not detecting a load ordering violation for a second fencing micro-operation:
    the second fencing micro-operation is completed.

13. The processor of claim 10, wherein the particular type of the fencing micro-operation is a load fencing micro-operation, and executing the fencing micro-operation in response to the fencing operation being an oldest memory access micro-operation comprises executing the fencing micro-operation in response to the load fencing micro-operation being an oldest load micro-operation in the load queue and allowing micro-operations younger than the load fencing micro-operation to execute or complete.

14. The processor of claim 10, wherein the particular type of the fencing micro-operation is a load fencing micro-operation, and executing the fencing micro-operation in response to the fencing micro-operation being an oldest memory access micro-operation comprises executing the fencing micro-operation in response to older load micro-operations in the load queue being executed or completed and allowing micro-operations younger than the load fencing micro-operation to execute or complete.

15. The processor of claim 10, wherein the particular type of the fencing micro-operation is a memory fencing micro-operation, and executing the fencing micro-operation in response to the fencing micro-operation being an oldest memory access micro-operation comprises executing the fencing operation in response to the memory fencing micro-operation being an oldest memory access micro-operation and allowing non-store micro-operations younger than the memory fencing micro-operation to execute or complete.

16. The processor of claim 10, wherein the particular type of the fencing micro-operation is a memory fencing micro-operation, and executing the fencing micro-operation in response to the fencing micro-operation being an oldest memory access micro-operation comprises executing the fencing operation in response to older load micro-operations and older store micro-operations being executed or completed and allowing non-store micro-operations younger than the memory fencing micro-operation to execute or complete.

17. The processor of claim 10, wherein control bits are set in a load micro-operation to indicate that the load micro-operation is the fencing micro-operation.

18. The processor of claim 10, wherein the retire queue includes micro-operations having load ordering violations.

19. The method of claim 1, wherein the plurality of types of fencing micro-operation include at least one of a load fencing micro-operation, a memory fencing micro-operation, and a store fencing micro-operation.

20. The processor of claim 10, wherein the plurality of types of fencing micro-operation include at least one of a load fencing micro-operation, a memory fencing micro-operation, and a store fencing micro-operation.

* * * * *